United States Patent
Pyle

(10) Patent No.: US 9,395,260 B2
(45) Date of Patent: Jul. 19, 2016

(54) PRESSURE DIFFERENTIAL INDICATOR WITH FIRE STOP

(71) Applicant: Robert D. Pyle, Cincinnati, OH (US)

(72) Inventor: Robert D. Pyle, Cincinnati, OH (US)

(73) Assignee: Lamiflow Air Systems, Inc., Cincinnati, OH (US)

( * ) Notice: Subject to any disclaimer, the term of this patent is extended or adjusted under 35 U.S.C. 154(b) by 137 days.

(21) Appl. No.: 14/218,228

(22) Filed: Mar. 18, 2014

(65) Prior Publication Data

US 2015/0268118 A1  Sep. 24, 2015

(51) Int. Cl.
| | |
|---|---|
| G01F 1/28 | (2006.01) |
| C09K 21/00 | (2006.01) |
| G01L 13/00 | (2006.01) |
| G01L 19/08 | (2006.01) |

(52) U.S. Cl.
CPC . *G01L 13/00* (2013.01); *G01F 1/28* (2013.01); *G01L 19/08* (2013.01)

(58) Field of Classification Search
None
See application file for complete search history.

(56) References Cited

U.S. PATENT DOCUMENTS

| | | | |
|---|---|---|---|
| 4,154,101 A | 5/1979 | Buchanan et al. | |
| 4,221,092 A * | 9/1980 | Johnson | F16L 5/04 52/232 |
| 5,228,306 A | 7/1993 | Shyu et al. | |
| 5,589,643 A | 12/1996 | Pyle | |
| 5,787,919 A | 8/1998 | Pyle | |
| 6,336,297 B1 | 1/2002 | Cornwall | |
| 6,694,684 B2 | 2/2004 | Radke et al. | |
| 6,732,481 B2 | 5/2004 | Stahl, Sr. | |
| 7,018,699 B2 | 3/2006 | Dykhoff | |
| 7,523,590 B2 | 4/2009 | Stahl, Sr. | |
| 7,540,118 B2 * | 6/2009 | Jensen | A62C 2/065 52/232 |
| RE43,997 E | 2/2013 | Stahl, Sr. | |
| 8,621,796 B2 * | 1/2014 | Egritepe | F16L 5/08 52/232 |
| 2003/0167712 A1 * | 9/2003 | Robertson | A62C 2/065 52/232 |
| 2008/0217043 A1 * | 9/2008 | Schoke | H02G 3/0412 174/110 R |
| 2012/0110934 A1 * | 5/2012 | Mattox | E04B 1/948 52/232 |

OTHER PUBLICATIONS

System Selector PoW Catalog: 3M™ Expantrol™ Flexible Intumescent Strip E-FIS; http://solutions.3m.com/wps/portal/3M/en_US/fire-protection-systems-NA/firestop/firestopping-products/firestop-system-selector/system-catalog/?PC_Z7_U00M8B1A0OP590IB369UJTI056000000_nid=9ZZNBJXF6Zbe57FFSRGX0Qgl; © 3M 2015; printed Jan. 6, 2015; pp. 1-2.

3M Fire Barrier Expantrol Flexible Intumescent Strip (E-Fis), Product Data; 3M Consumer Safety and Light Management www.3M.com/firestop; © 3M 2002; printed Jan. 6, 2015; pp. 1-2.

* cited by examiner

*Primary Examiner* — Harshad R Patel
(74) *Attorney, Agent, or Firm* — Hasse & Nesbitt LLC; Daniel F. Nesbitt

(57) ABSTRACT

An across the wall pressure differential indicating apparatus comprising a wall duct having first and second open ends, first and second mounting plates respectively attached to the wall duct at the first and second open ends respectively, a low speed airflow indicator adapted to indicate a pressure differential and mounted in fluid communication with the wall duct such that substantially all airflow passing through the wall duct also passes through the indicator, and an intumescent material disposed in the wall duct between the first and second ends.

16 Claims, 6 Drawing Sheets

PRESSURE DIFFERENTIAL INDICATOR WITH FIRE STOP

FIELD OF THE INVENTION

This invention relates to pressure differential indicators for fire rated walls. More particularly, this invention related to pressure differential indicators with an intumescent material or a door or both for fire rated walls.

BACKGROUND OF THE INVENTION

Some specific spaces or rooms such as at a hospital require a proper negative or positive pressure in the interior space or room in order to prevent germs or virus dissipating through a fissure by airflow to an exterior space outside the room such as an exterior room, hallway or corridor. The interior air pressure is lower than that at the exterior because airflow travels from a space of higher pressure to a space of lower pressure. It is well known to provide a device that keeps the interior air pressure lower than that of the exterior in order to maintain a clean and healthy environment, such a system is described in U.S. Pat. No. 5,228,306. It is necessary for the doctors, nurses, and other concerned employees and individuals to easily monitor whether or not a proper vacuum (a negative pressure differential) is being maintained in a room from outside the room such as in the hallway or corridor. Fairly sophisticated devices, usually electronically controlled, have been developed for this purpose. However, these devices are expensive to procure and maintain and subject to failure. Furthermore, because the pressure differential across such walls, particularly hospital walls, is very small, present day devices are expensive and difficult to maintain and calibrate.

A pressure differential indicating apparatus, which incorporates a preferably adjustable airflow duct across the wall between the low and high pressure spaces and a low airflow indicator on the side of the wall opposite the space that is to be monitored to indicate air pressure differentials and particularly low pressure differentials across walls is disclosed in U.S. Pat. No. 5,589,643 which issued Dec. 31, 1996 and is incorporated herein by reference in its entirety.

One conventional air velocity measuring device uses a hot wire anemometer, which requires electrical power to operate and is expensive. A relatively less expensive mechanical device, a rotational vane type that has a number of intricate moving parts that require maintenance, is still relatively expensive and is not easy to monitor by a person walking down a hospital hall.

When the pressure differential indicating apparatus referenced U.S. Pat. No. 5,589,643 is placed in a fire rated wall, such as found in many hospitals and other buildings, it too must be fire rated. One method of providing a fire rated pressure differential indicating apparatus is to incorporate an intumescent material in the apparatus. Another method is to provide a door that is typically in the closed position and is opened to take a pressure differential measurement.

SUMMARY OF THE INVENTION

This invention relates to an across the wall pressure differential indicating apparatus comprising a wall duct having first and second open ends, first and second mounting plates respectively attached to the wall duct at the first and second open ends respectively, a low speed airflow indicator adapted to indicate a pressure differential and mounted in fluid communication with the wall duct such that substantially all airflow passing through the wall duct also passes through the indicator, and an intumescent material disposed in the wall duct between the first and second ends.

This invention also relates to an across the wall pressure differential indicating apparatus comprising a wall duct having first and second open ends, first and second mounting plates respectively attached to the wall duct at the first and second open ends respectively, a low speed airflow indicator adapted to indicate a pressure differential and mounted in fluid communication with the wall duct such that substantially all airflow passing through the wall duct also passes through the indicator, and a door disposed on the wall duct for limiting airflow through the wall duct.

DETAILED DESCRIPTION OF THE INVENTION

Figure 1:
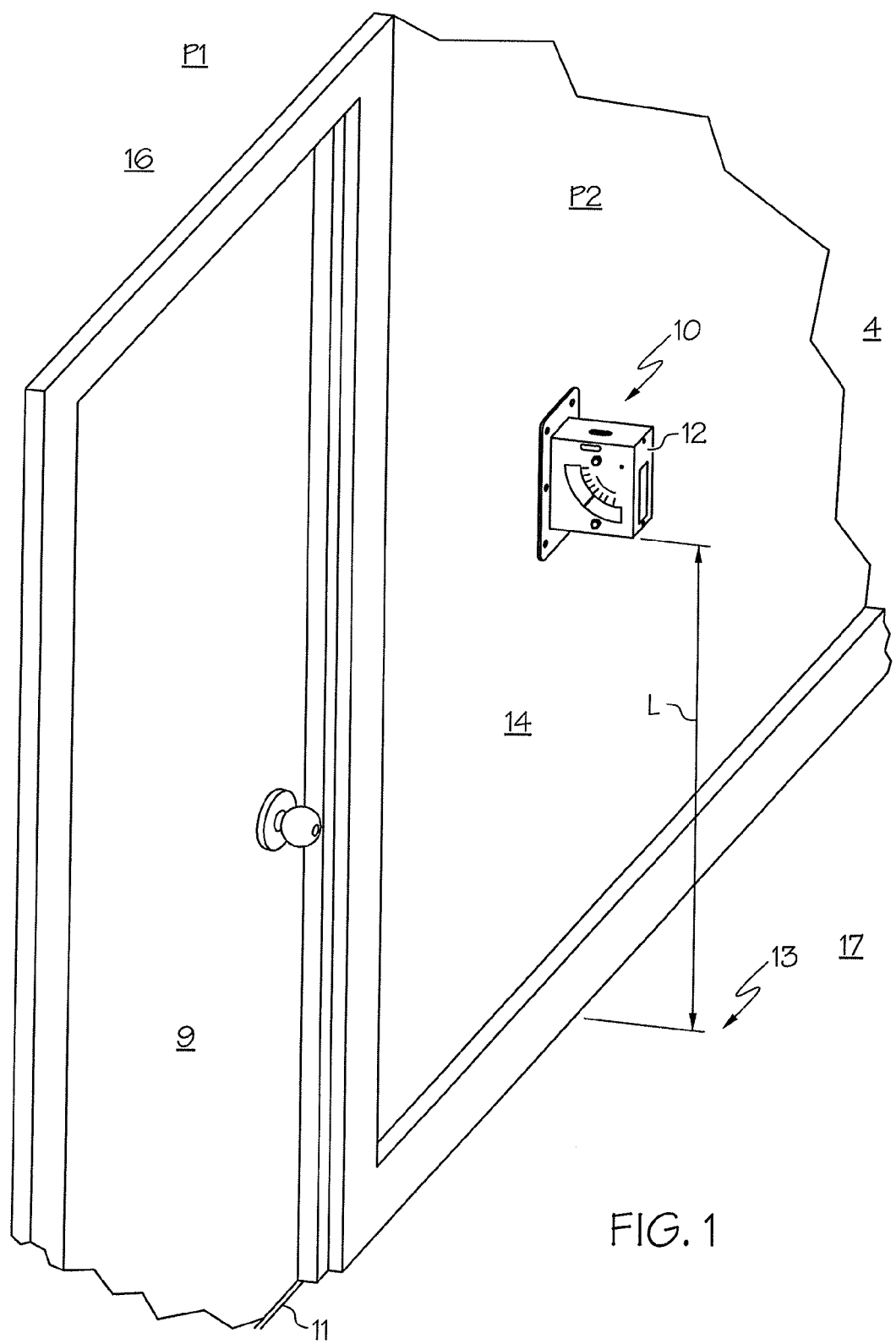
FIG. 1 is a perspective view of a room and a pressure differential indicator with an exemplary embodiment of the present invention mounted on the wall.

Illustrated in FIG. 1 is an exemplary embodiment of a pressure differential indicating apparatus 10 having a low speed airflow indicator 12 adapted to indicate a pressure differential across a wall 14 of a room 16. The pressure differential indicating apparatus 10 is operably mounted so that the indicator 12 is positioned on the wall 14 outside of the room 16 at an easily observable level L (eye level or other) above the floor 13 of a corridor 17. The room 16 is typical of one often found in a hospital which requires a proper negative pressure in the interior space or room 16 in order to prevent germs or virus dissipating through a fissure 11 such as may be found under a room door 9 by airflow to an exterior space outside the room such as an exterior room, hallway, or corridor 17. The interior air pressure indicated by P1 is lower than that of the exterior air pressure P2 because airflow travels from a space of higher pressure to a space of lower pressure.

Figure 2:
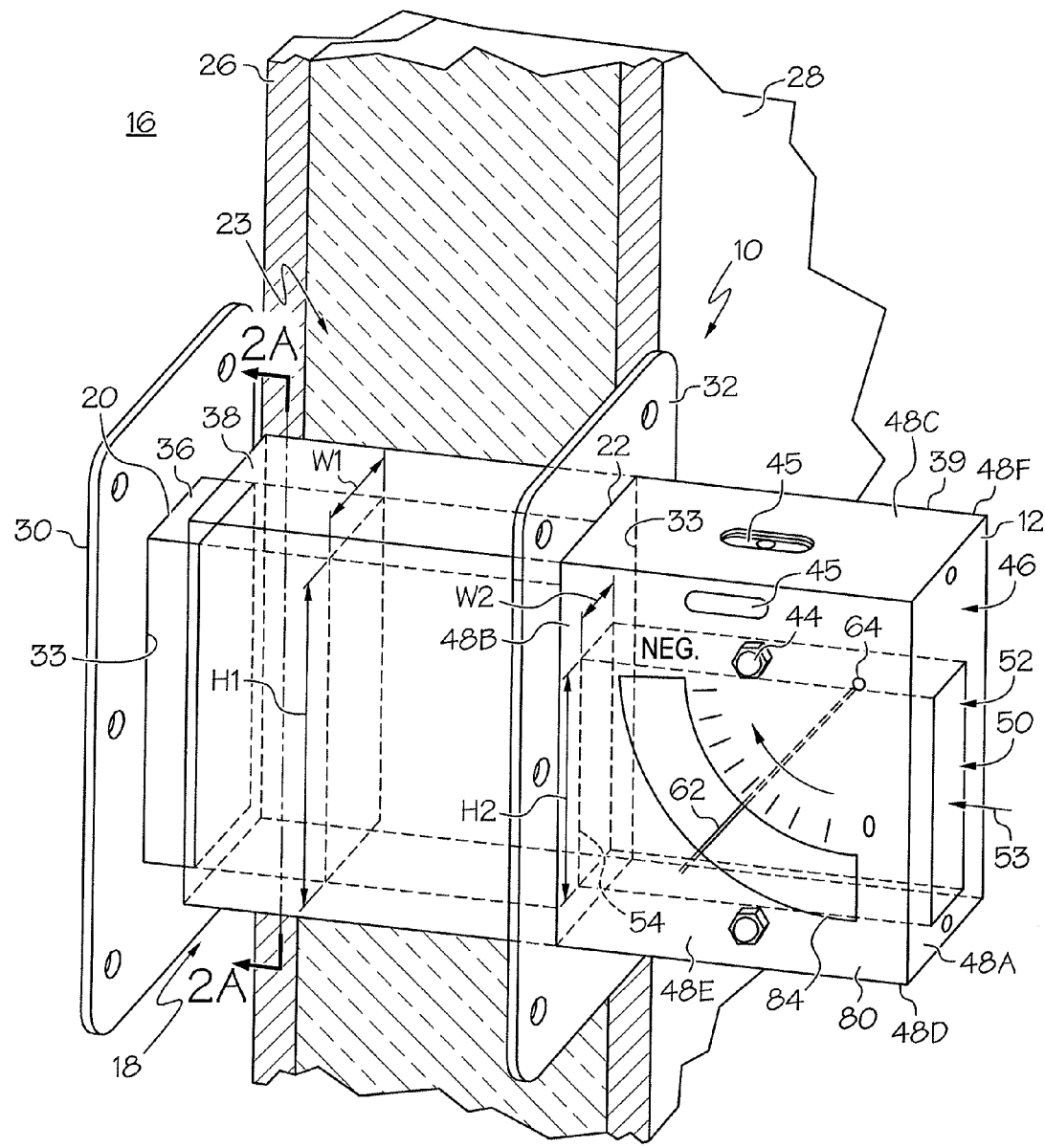
FIG. 2 is an enlarged perspective view of the pressure differential indicator illustrated in FIG. 1.
Figure 2A:
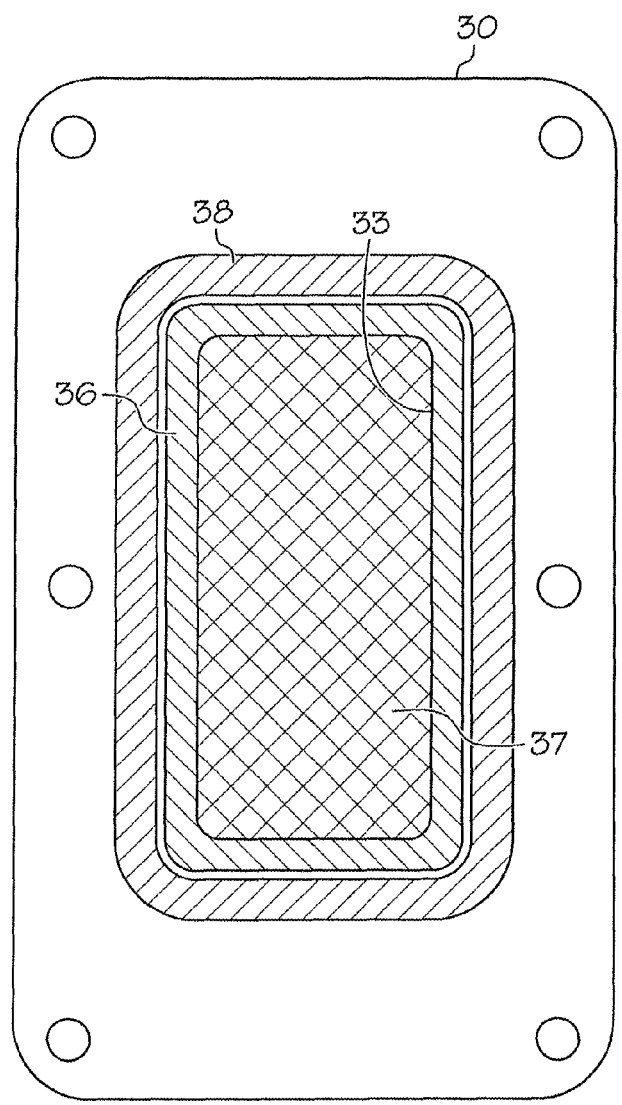
FIG. 2A is a frontal view along 2A-2A of a mounting plate of the apparatus in FIG. 2.

Referring now to FIG. 2, the pressure differential indicating apparatus 10 includes a wall duct 18 to which the low speed airflow indicator 12 mounted in operable fluid communication such that at least a portion of the airflow passing through the wall duct also passes through the indicator. Additionally, substantially all or all of the airflow passing through the wall duct also passes through the indicator. The wall duct 18 has first and second open ends 20 and 22, respectively, which are correspondingly disposed through a hole 23 which extends through the wall 14. Flange like first and second mounting plates 30 and 32, respectively, having apertures 33 are connected to the first and second open ends 20 and 22 of the wall duct 18 and mounted to oppositely facing first and second sides 26 and 28, respectively, of the wall 14. The plates are attached to the ends in a flange like fashion surrounding the first and second open ends 20 and 22 such to allow unrestricted airflow to pass through the first and second open ends 20 and 22. The airflow indicator 12 is mounted on a side of the second mounting plate 32 opposite that by which the second mounting plate is mounted to the wall 14 such that all airflow passing through the wall duct 18 also passes through the indicator. Referring briefly to FIG. 2A, a screen 37 may be placed over the apertures 33 shown as the one on the room side of the wall 14, on the first open end 20.

The wall duct 18 may be an adjustable length wall duct having two sections, a first section 36 attached to the first mounting plate 30 and a second section 38 attached to the second mounting plate 32. One of the two sections is constructed so as to be slidingly disposed in and in sealing engagement with the other of the two sections. The first section 36 is slidingly disposed in and in sealing engagement with the second section 38. The second section 38 may include an extension 39 to provide a convenient casing into which the indicator 12 may be mounted. The extension 39 may be made of Plexiglas or other material through which a vane 62 of the indicator 12 may be seen. The first section 36 and second section 38 of the wall duct 18 may be made from steel, stainless steel, or other material able to withstand temperatures it would be exposed to in a fire. The indicator 12 can be mounted by screws 44 or some other means of attachment to the second section 38 and the indicator 12 may include bubble levels 45 to help mount the entire apparatus and adjust the indicator parallel to the floor. The wall duct 18 provides an airway between the inside and outside of the room in order to develop a low speed airflow from the higher pressure area in the hallway outside the room to the lower pressure area inside the room.

The airflow indicator 12 includes a housing 46 having front, back, top, bottom, left, and right wall portions 48A-48F, respectively, defining a rectangular draft way 50 extending therethrough. The front wall portion 48A has an inlet port 52 and the back wall portion 48B has a draft outlet port 54 and the approximate size of the draft way 50. The elongated vane 62 is suspended pendulum fashion from an upper portion 64 of the housing 46 adjacent to the inlet port 52 and is disposed perpendicular to the left and right wall portions 48E and 48F and transversely of the draft way 50. The vane 62 is pivotally mounted adjacent its upper end for free swinging movement between an at rest vertically disposed position for zero airflow through the way to an inclined position angled in the direction of airflow, indicated by arrow 53, through the way for airflow that is induced through the way by a pressure differential across the wall 14. The vane 62 is proportioned to substantially close off the way when the vane is in its vertical at rest position and the vane, preferably, is a length of stripping of film thickness dimensions. The strip may have indentation means extending longitudinally thereof for holding the strip against flexure. Dwyer Instruments, Inc. in Indiana is a commercial vendor that can supply such an indicator, suitable for use in the present invention, and based on an Air Velocity Gauge disclosed in U.S. Pat. No. 4,154,101.

The airflow indicator 12 is mounted such that the front wall portion 48A and its draft outlet port 54 abuts or is close to the second mounting plate 32. A first cross-sectional area of the wall duct 18 as defined by a first width W1 and first height H1 of the rectangular wall duct is substantially greater than a second cross-sectional area of the draft outlet port 54 as defined by a second width W2 and a second height H2. Typically, H1 is about two times W1 and H2 is two times W2, but other ratios may be used. This assists in providing an unrestricted area for an airflow indicative of the pressure differential across the wall to develop. Mounting the airflow indicator 12 in a clear plastic duct allows for ease of use and manufacture because the airflow indicator 12 may be reversed such that the inlet port 52 and vane 62 are positioned close to the second mounting plate 32 and its aperture 33 if one wanted the apparatus to indicate a positive pressure differential across the wall 14 as opposed to a negative pressure differential or pressure drop across the wall with respect to an observer outside the room 16.

A face plate 80 is mounted in the housing and has an arcuate slot 84 to form a window for viewing the position of vane. The face plate 80 has markings to indicate the desired pressure drop or range. It need not be calibrated or gauged. This provides an easily read indicator for informing observers passing by that sufficient pressure drop exists across the wall and that equipment designed to maintain the pressure drop is operating.

Figure 3:
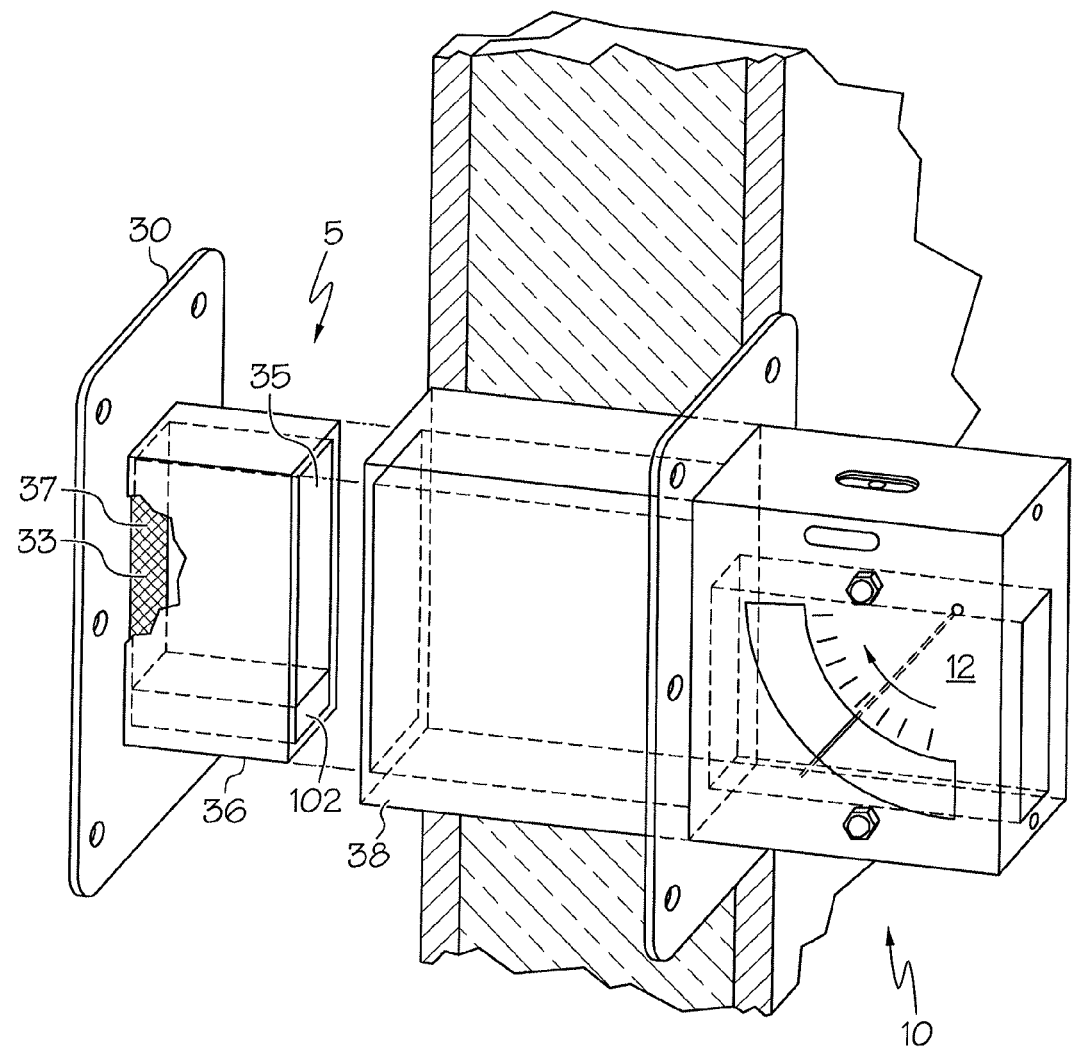
FIG. 3 is a perspective view another embodiment having an intumescent fire stop in the pressure differential indicator.
Figure 4:
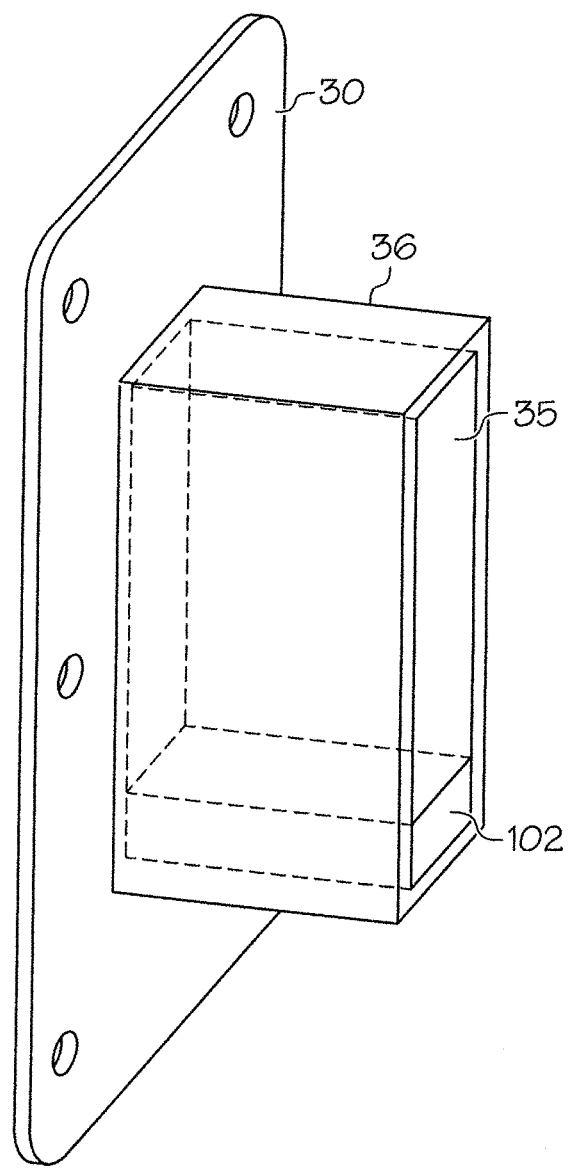
FIG. 4 is a detailed perspective view of a first section of the pressure differential indicator having the intumescent fire stop.

In another embodiment, shown in FIG. 3, disposed in a duct portion 35 of the first section 36 is an intumescent material 102. Intumescent materials swell when exposed to heat, and thus can be used in passive fire protection. Here, when the intumescent material 102 is exposed to heat, such as a fire, it swells to fill the aperture 33, thus preventing smoke or fire from passing through the duct portion 35. The intumescent material could also be located in draftway 50 of the housing 46. One type of intumescent material that may be used is 3M® Expantrol™ Flexible Intumescent Strip E-FIS. Other types of intumescent materials may also be used. FIG. 4 is another view of first section 36 showing the intumescent material 102.

Figure 5:
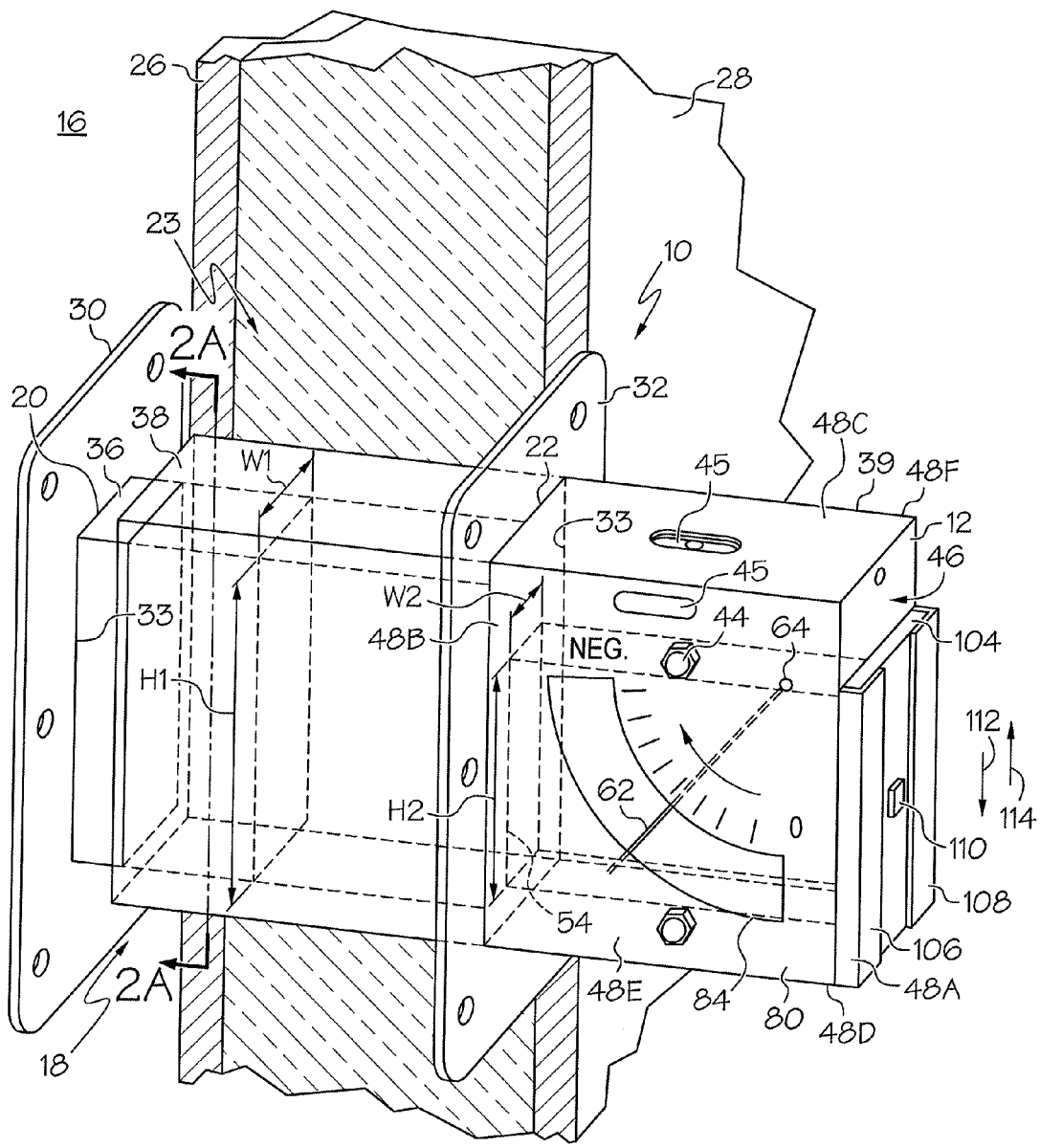
FIG. 5 is a perspective view of another embodiment of a pressure differential indicator having a slideable door.

In another embodiment, shown in FIG. 5, a slideable door 104 is retained by a first guide 106 and a second guide 108 against the housing 46 to block flow through the inlet port 52 and the draft way 50. Typically, the default position for the door is in the closed position, as shown in FIG. 5. When the door 104 is in the closed position, in the event of a fire, smoke, or chemical emergency in the corridor, it prevents air, gasses, smoke, or fire from passing from the corridor 17 through the draftway 50 and into the room 16. If there is a fire, smoke, or chemical emergency in the room 16, it prevents air, gasses, smoke, or fire from passing from the room 16 through the draftway 50 and into the corridor 17. The slideable door 104 has a protrusion 110 to allow an operator, by hand or with a reaching device such as a rod, to slide the door upwardly in the direction of arrow 112 to allow air to flow through the draftway 50 to measure airflow with the air speed indicator 12. Typically, the door will fall back in the direction of arrow 114 to a closed position when the operator releases the protrusion. Instead of a slideable door, a door with a hinge may also be used. A spring or other positive closing device may be used to force the door downward in the direction of arrow 114 to a closed position or to close a hinged door. Additionally, an intumescent material may be used in combination with the slideable door.

While the present invention has been illustrated by the description of embodiments thereof, and while the embodiments have been described in considerable detail, it is not intended to restrict or in any way limit the scope of the appended claims to such detail. Additional advantages and modifications will be readily apparent to those skilled in the art. The invention is therefore not limited to the specific details, representative apparatus and method, and illustrated examples shown and described. Accordingly, departures may be made from such details without departing from the scope or spirit of the invention.

What is claimed is:

1. An across the wall pressure differential indicating apparatus comprising:
   a wall duct having first and second open ends, first and second mounting plates respectively attached to the wall duct at the first and second open ends respectively, a low speed airflow indicator adapted to indicate a pressure differential and mounted in fluid communication with the wall duct such that substantially all airflow passing through the wall duct also passes through the indicator, and an intumescent material disposed in the wall duct between the first and second ends.

2. The apparatus according to claim 1 wherein the wall duct is an adjustable length wall duct.

3. The apparatus according to claim 2 wherein the adjustable length wall duct comprises two sections wherein a first section is attached to the first mounting plate and a second section is attached to the second mounting plate and the first section is slidingly disposed in and in sealing engagement with the second section.

4. The apparatus according to claim 3 wherein the wall duct is made from a material selected from the group consisting of steel, stainless steel, or other material able to withstand a temperature to which it would be exposed in a fire.

5. The apparatus according to claim 4 wherein the intumescent material is disposed in the first section of the wall duct between the first and second ends.

6. The apparatus according to claim 3 wherein the intumescent material is disposed in the first section of the wall duct between the first and second ends.

7. The apparatus according to claim 3 wherein the intumescent material, when exposed to heat, swells to fill in the first section of the wall duct.

8. The apparatus according to claim 1 wherein the airflow indicator comprises:

a housing having wall portions defining a planar draft way extending therethrough and a draft inlet port thereto and a draft outlet port therefrom that are aligned with the plane of and approximate the size of the planar draft way, an elongate vane pivotably suspended from an upper portion of the housing adjacent to the inlet port and disposed transversely of the planar draft way, wherein the elongated vane is pivotally mounted adjacent its upper end for free swinging movement between an at rest vertically disposed position for zero air flow through the planar draft way to an inclined position angled in the direction of air flow through the planar draft way on air flow being induced through the planar draft way, and the elongated vane is proportioned to substantially partition off the planar draft way when the elongated vane is in its at rest position.

9. The apparatus according to claim 8 wherein the elongated vane comprises a length of stripping of film thickness dimensions.

10. The apparatus according to claim 9 wherein the length of stripping includes indentations extending longitudinally for holding same against flexure.

11. The apparatus according to claim 8 wherein the wall duct is an adjustable length wall duct.

12. The apparatus according to claim 11 wherein the adjustable length wall duct comprises two sections wherein a first section is attached to the first mounting plate and a second section is attached to the second mounting plate and the first section is slidingly disposed in and in sealing engagement with the second section.

13. The apparatus according to claim 8 wherein a first cross-sectional area of the wall duct is substantially greater than a second cross-sectional area of the opening in the end wall that is attached to one of the mounting plates.

14. The apparatus according to claim 1 wherein the wall duct is made from a material selected from the group consisting of steel, stainless steel, or other material able to withstand a temperature to which it would be exposed in a fire.

15. The apparatus according to claim 14 wherein the intumescent material, when exposed to heat, swells to fill in the wall duct.

16. The apparatus according to claim 1 wherein the intumescent material, when exposed to heat, swells to fill the wall duct.

* * * * *